Patented July 15, 1924.

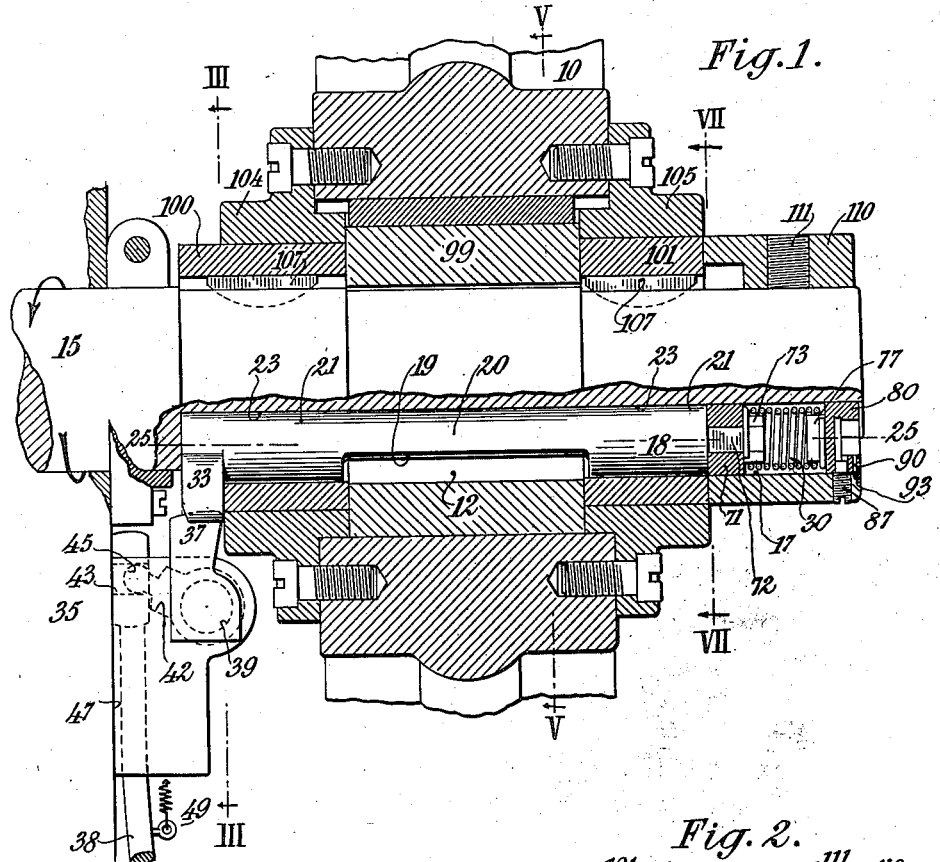

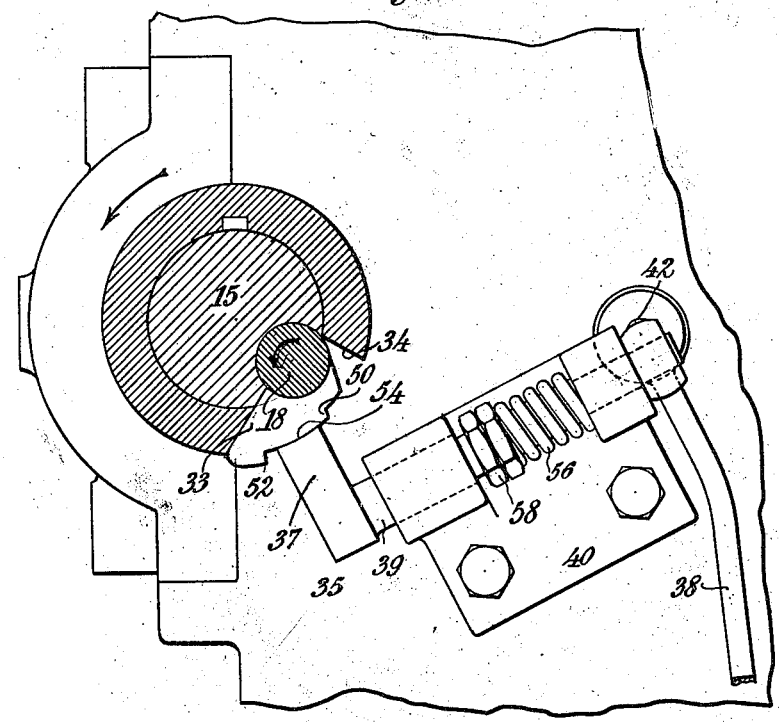
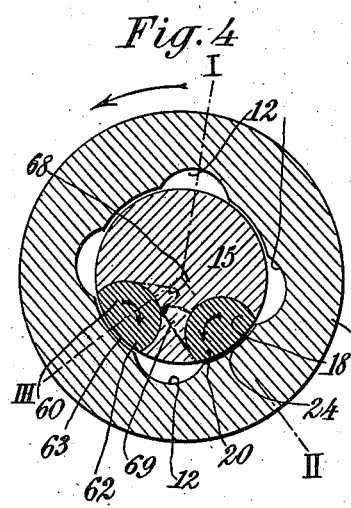
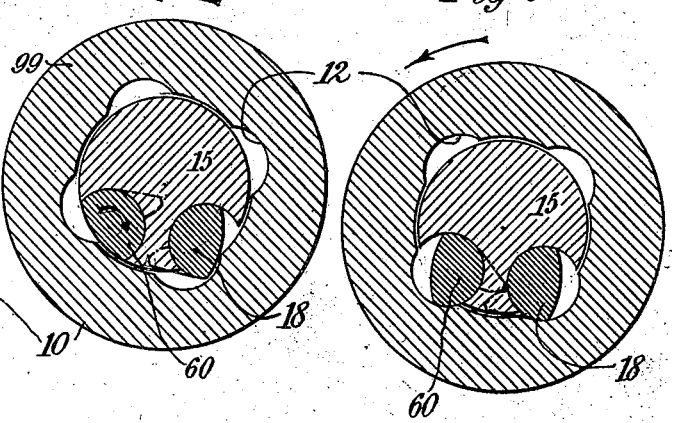

1,501,422

UNITED STATES PATENT OFFICE.

ROBERT W. STROUT, OF BROOKLYN, NEW YORK, ASSIGNOR TO E. W. BLISS COMPANY, OF BROOKLYN, NEW YORK, A CORPORATION OF WEST VIRGINIA.

KEY CLUTCH.

Application filed September 22, 1922. Serial No. 589,818.

*To all whom it may concern:*

Be it known that I, ROBERT W. STROUT, a citizen of the United States of America, residing in the borough of Brooklyn, county of Kings, city and State of New York, have invented certain new and useful Improvements in Key Clutches, of which the following is a specification.

This invention relates to clutches and aims to provide improvements therein.

The invention further relates to a clutch of the type employing an oscillatory clutch key or pin which engages the driving part to turn the driven part forwardly, and which may also comprise means for locking the driven part to the driving part to prevent the driven part running ahead of the driver, and provides a clutch of this character in which the clutch key may move into clutching engagement with the driving part free of the said locking means, and hence provide reliable and improved action of the clutch.

The invention may further comprise means for controlling the clutch and locking keys or pins, whereby the locking means may be rendered inoperative, where the press is used under such conditions as not to require the use of the locking means, and whereby both the clutch key and locking means may be rendered inoperative, which is a feature of safety, useful in the setting of dies, etc.

The invention further provides a construction which is simple, durable and readily made.

The invention further provides a novel combination, and subcombinations, of parts of a clutch construction having features herein described.

An embodiment of the invention is illustrated in the accompanying drawings, in which:

Figure 1 is a view in longitudinal section, showing the invention applied to a press, the section being on the line I—II, Fig. 4.

Fig. 2 is also a longitudinal view in section on the line I—III in Fig. 4.

Fig. 3 is a view in section on the line III—III, Fig. 1.

Figs. 4, 5 and 6 are sectional views on the line V—V, Fig. 1, showing the clutch and locking keys in different operative positions.

Fig. 7 is a sectional view on the line VII—VII, Fig. 1.

Fig. 8 is an end view looking from the right, Fig. 1.

Referring to the drawings, numeral 10 designates the driving part, conveniently in the form of the fly-wheel pulley, in the hub of which is formed one or more recesses or notches 12.

Numeral 15 designates the driven part, here shown as the shaft of a press, for example, a crank shaft, driving the punch. Within a recess 17 in the shaft is a pin or key 18 adapted to be engaged and disengaged in and from the notch or notches 12 in the driving part 10. The pin 18 has round trunnions or portions at both ends, as indicated at 21, and fits in correspondingly round sockets 23 formed in the shaft 15. The pin 18 is conveniently in the form of a round rod having a segmental portion 19 cut out therefrom, and leaving an engaging or segmental portion 20 for engaging the notches 12. The axis 25 of the key is located close to the circumference of the shaft 15, in such manner that the segmental portion 20 may enter the recess or notch 12. Moreover, the profile 24, Fig. 4, of the segmental portion 20 is cut on an arc having its center in the center of the shaft 15, and in such manner as to occupy a position flush with the circumference of the shaft 15 in the disengaged position of the parts.

Clutching and declutching is effected by oscillating or turning the key 18 on its axis 25 in such manner as to bring the segmental portion 20 into and out of position in a notch 12 of the driving part 10, Figs. 4, 5, 6. In the position shown in Fig. 6, the segmental portion 20 projects into the notch 12 and hence the driving and driven parts 10 and 11 are in engagement, and the shaft 15 is consequently driven. By turning the key 18 so that the profile 24 of the segmental portion 20 is flush with the circumference of the shaft, Fig. 4, said segmental portion will be out of position to engage in the notch or notches 12, and hence the driving part 10 will be free to turn without driving the shaft or driven part 15.

The key 18 is normally turned by means of a spring 30 in a direction to engage in a notch 12 of the driving part, and the key is disengaged from the notch 12 by turning it against the action of the spring 30, conveniently through an arm 33 on one end of the key 18. A shoulder 34 on the driven part 15 acts as a stop or abutment for limiting the turning of the arm 33 and consequently of the key 18.

Suitable means 35 for automatically turning the key 18 to disengage it from the driving part similar to the means disclosed in my application filed November 2, 1921, Serial No. 512,214, for example, is provided, and this means conveniently comprises a rocking pawl 37, connected to a treadle or the like (not shown), by means of the rod 38. The pawl 37 is conveniently mounted upon a rock shaft 39 journaled in a bracket 40 and having an arm 42 thereon, to which arm the treadle rod 38 is conveniently connected. The treadle rod 38 conveniently has an eye 43 in its end, which engages a ball 45 on said arm 42. The said treadle rod 38 conveniently slides against an adjacent part 47 of the press frame, and the said adjacent part 47 of the press frame conveniently acts to hold the eye 43 and ball 45 connected. A spring 49 may be provided for normally turning the pawl 37 into position to engage the arm 43. The spring 49 is conveniently connected to the treadle rod 38, and consequently acts through the said treadle rod 38 on the rock shaft 39 carrying the said pawl 37.

The arm 33 is preferably formed with an abrupt shoulder 50, a hooked end 52, and a portion 54 concentric with the shaft 15 in the position of such arm shown in Fig. 3, that is in a position where the clutch-key 18 is disengaged from a recess 12 in the driving part 10.

Moreover the pawl 37 and its rock shaft 39 are preferably so arranged that the direction of reaction to the impact between said shoulder 50 and said pawl 37 is substantially tangential (or parallel to a tangent) to the circle of revolution of said shoulder 50 at the point of impact.

The pawl 37 is preferably resiliently mounted in the direction of the reaction to impact. To this end a spring 56 is arranged around the shaft 39 and bears at one end on a collar or nut 58 on said shaft 39, and bears at its other end upon the bracket 40.

In the position of said key 18 in which it is engaged with a notch 12 the shoulder 50 on the arm 37 projects slightly beyond the circumference of the shaft 15. When this projecting shoulder 50 strikes the pawl 37 (at the end of the rotation of the shaft 15) the arm 33 is turned, thereby turning the key 18 so as to move the engaging portion 20 thereof out of engagement with the notch 12 in the driving part 10. As the arm 33 turns around the axis 25 of the key 18 the shoulder 50 moves in towards the center of the shaft 15, whereupon the said shoulder becomes flush with, or projects less beyond, the circumference of the shaft 15. The impact between the shoulder 50 and the pawl 39 slightly compresses the spring 56, and this compression effects two purposes. First, it cushions the shock or impact, and secondly, it causes the pawl 37 to rebound toward the shoulder 50, insuring that the pawl will pass over said shoulder 50 on to the concentric portion 54 of the arm 37, thereby assuring that the key 18 will be held in a position whereby no part of the segmental portion 20 of the key will project beyond the circumference of the shaft 15 and the driven part or shaft 15 will remain completely declutched from the driving part or wheel 10.

When a press having a clutch key of the character described is equipped with a spring or fluid pressure drawing attachment, the driven part or shaft 15 is likely, on its upstroke, to be driven ahead of the driving part, due to the reaction on the punch of the spring or of the compressed fluid of the drawing attachment or other resilient press tool, and due to the fact that the key 18 may turn or yield against the tension of spring 30 when the segmental face 19 strikes the corner of the recess 12.

Suitable means are provided for preventing the driving ahead of the shaft or driven part 15 during engagement of the clutch key 18 and a notch 12 of the driving part 10. This means is conveniently in the form of a locking key or stud 60, Fig. 2. The locking key 60 is conveniently in the form of a short round bar, having a segmental portion 62 with a profile 63, Fig. 4, similar to the locking key 18. There is also conveniently formed a round bearing part 65, and its axis 66 is arranged close to the circumference of the shaft 15 in a suitable recess 67, and at a suitable angle from the axis 25 of the key 18 to enter one of the notches 12 when the key 18 is in another notch 12.

It will be seen (Fig. 4) that the segmental portion 62 of the locking key 60 engages a notch 12 in an opposite direction to the segmental portion 20 of the clutch key 18 and hence reactions tending to drive the driven part or shaft 15 ahead of the driving part 10 are communicated through the locking key 60 to the said driving part, relative movement of the driven part 15 and driving part 10 is prevented, and sudden movements and consequent shocks of the driven part and press parts connected therewith, are prevented, such reactions being absorbed by the inertia of the fly-wheel and parts back of it.

Means are preferably provided for engaging and disengaging the locking key 60 from the recess or notch 12 through the clutch key 18, and conveniently simultaneously with the movement of the said key 18. These means are preferably in the form of a pair of gear teeth 68, 69, one on the key 18 and one on the key 60. The gear teeth are so arranged that, while turning movement of the clutch key 18 in a direction to declutch will be communicated through the tooth 68 to the locking key 60, the said clutch-key is free to turn in a direction to enter one or another of the notches 12, that is, to clutch. This is of practical importance in the operation of the clutch, as it enables the clutch-key 18 to turn into a notch 12, as soon as its axis passes the near edge of said notch (see Fig. 5), and thereby make full contact with the opposite side of said notch 12, when the turning of the wheel 10 carrying said notches brings said notch 12 into line with said clutch key 18. Moreover, this turning of the clutch key 18 is able to begin at a time when the locking key 60 is unable to turn by reason of the contact of its turning edge with the portion of said wheel 10 adjacent the near edge of a notch 12 (see Fig. 5). In other words, the clutch key 18 can turn into a notch 12 as soon as its axis passes the near edge of the notch 12, whereas the locking key 60 cannot turn until its axis is in radial alinement with the notch 12. This freedom of the clutch-key 18 from the locking key 60 in turning into clutching position enables said clutch to surely and reliably operate to connect the driving and driven parts 10 and 15.

A spring 70 may be provided for normally turning said locking key 60 in a direction to engage a notch 12 of the driving part, and this spring also serves to keep the tooth 69 in contact with the tooth 68.

For purposes of assembly, the tooth 68 is conveniently formed on a separable part 71 engaging a squared end 72 formed on said key 18.

Means are preferably provided for controlling the operation of the keys 18 and 60, in such manner that the key 60 may be held out of action, while the key 18 is operative (which enables the mechanic to perform the operation known as "bumping" the press), and also in such manner that both the keys 18 and 60 may be held in inoperative position, so that the driving part may turn idly and render operation of the clutch-operating mechanism ineffective to start the press. To this end the springs 30 and 70 are conveniently formed as coil springs and engage slots 73, 74 in the ends of the keys 18 and 60, the springs being housed in prolongations of the recesses 17 and 67. The opposite ends of the coil springs engage slots 77, 78 formed in disks 80, 81 which may be turned by means of a suitable tool fitting the squared sockets 83, 84 therein, to tension the springs, and which may be fastened in desired positions by means of set screws 87, 88 or the like. A pin 90, 91 turning in slots 93, 94 may be provided for limiting the turning movement of said disks 80, 81, and each of the screws 87, 88, may be provided with reduced ends fitting in recesses in the disks 80, 81, for holding the said disks against longitudinal displacement in the recesses 17 and 67.

When it is desired that both the clutch key 18 and locking key 60 operate under the action of the clutch-operating mechanism 35, the disks 80, 81 are secured in the position shown in Fig. 8 where the springs 30 and 70 are tensioned to normally tend to turn the keys 18 and 60 into the notches 12. When it is desired to hold the locking key 60 out of action, the disk 81 is turned in an opposite direction, where the spring tension is such as to hold the key 60 out of the notches 12 and with its tooth 69 out of contact with the tooth 68. The lug 68 on the clutch key 18 is, however, free to turn and hence the clutch key 18 may be turned to engage and disengage one of the notches 12.

Where it is desired to hold both the locking key 60 and the clutch key 18 out of operation, the disk 80 is also turned in an opposite direction, so that the spring-tension holds the key 18 out of a groove 12, and therefore operation of the clutch-operating means 35 will be without effect in connecting the driving and driven parts of the clutch. This is a feature of safety for preventing the press from being accidentally started when the press is being repaired or dies are being set.

In order that the notches 12 may not subtract too much from the bearing surface of the driving part 10, the said notches 12 are preferably formed in only a part of the length of the hub or bearing, conveniently a middle portion 99, and the shaft 18 is provided with enlargements 100, 101, which are uninterrupted in circumference and which constitute the proper (or in fact the entire) bearing, and the hub of the driving part 10 may be formed with corresponding uninterrupted portions 104, 105. The enlargements 100, 101 are conveniently formed as separate parts, for the purpose of assembling, and are fastened to the shaft 18 by suitable means as keys 107. The enlargements 100, 101 also enable the parts 21 of the key 18 to be formed of the full diameter of the stock from which the key is formed, the recesses 23 being partially formed in the enlargements 100, 101. The part of the driving part 10 between the portions 104, 105, is preferably made with a slight clearance from the shaft 15, so that less precision of position of the clutch key 18 in its position of disengagement (flush with circumference of shaft) is required. Knocking of the key 18 on the edges of the recesses 12 is likely to occur otherwise.

A collar 110, secured to the end o. the shaft 15 by set screws 111 or the like, serves to hold the driving part or wheel 10 on the shaft, and also to partially house the springs 30 and 70 and disks 80, 81.

The operation of the parts will be clearly understood from the foregoing description.

The inventive ideas may receive other embodiments than that herein specifically illustrated and described.

What I claim is:

A clutch comprising a driving and a driven part, one of said parts comprising an oscillatory key having a projection adapted to be turned into and out of engagement with said other part, to drive when said driving part turns in one direction and to yield when said driving part turns in the other direction, means for locking said driven part to said driving part, whereby running ahead of said driven part is prevented, and means for controlling the operation of said clutch key and locking means, whereby said locking means or said locking means and clutch key may be rendered inoperative, said control means comprising disks and resilient connections between said disks and said clutch key and said locking means, said disks being rotatable to tension said resilient connections to turn said keys to declutching position.

In witness whereof, I have hereunto signed my name.

ROBERT W. STROUT.